US012771248B2

(12) United States Patent
Kuo et al.

(10) Patent No.: US 12,771,248 B2
(45) Date of Patent: Oct. 20, 2026

(54) SELECTING EXTERNAL OR INTERNAL MODE SETTINGS FROM A SINGLE PIN

(71) Applicant: ASUSTeK COMPUTER INC., Taipei City (TW)

(72) Inventors: Min-Hou Kuo, Taipei City (TW); Hsiang-Jui Hung, Taipei City (TW); Sheng-Chieh Su, Taipei City (TW); Hong-Shen Liu, Taipei City (TW); Jia-Ching Huang, Taipei City (TW); Bo-Siang Cheng, Taipei City (TW); Yen-Yong Wu, Taipei City (TW)

(73) Assignee: ASUSTeK COMPUTER INC., Taipei City (TW)

( * ) Notice: Subject to any disclaimer, the term of this patent is extended or adjusted under 35 U.S.C. 154(b) by 352 days.

(21) Appl. No.: 18/513,659

(22) Filed: Nov. 20, 2023

(65) Prior Publication Data

US 2024/0297572 A1 Sep. 5, 2024

(30) Foreign Application Priority Data

Mar. 1, 2023 (TW) ................................ 112107279

(51) Int. Cl.
*H02M 3/155* (2006.01)
*G06F 1/26* (2006.01)

(52) U.S. Cl.
CPC ............... *H02M 3/155* (2013.01); *G06F 1/26* (2013.01)

(58) Field of Classification Search
CPC .................................................... H02M 3/155
See application file for complete search history.

(56) References Cited

U.S. PATENT DOCUMENTS

| | | | | |
|---|---|---|---|---|
| 8,051,311 | B2 | 11/2011 | Shi | |
| 9,667,095 | B2 | 5/2017 | Li et al. | |
| 11,915,654 | B1 * | 2/2024 | Zhou | G09G 3/3291 |
| 2020/0412356 | A1 * | 12/2020 | Mukunoki | H03K 17/0828 |
| 2023/0236615 | A1 * | 7/2023 | Pang | G05F 1/575 323/273 |

FOREIGN PATENT DOCUMENTS

| | | |
|---|---|---|
| CN | 101581960 | 7/2011 |
| CN | 104062914 | 9/2014 |

* cited by examiner

*Primary Examiner* — Peter M Novak
(74) *Attorney, Agent, or Firm* — JCIPRNET

(57) ABSTRACT

A control circuit for controlling a power module is provided. The power module drives a processing circuit. The control circuit includes a first resistor, a second resistor, a trigger circuit, and a switch circuit. The first resistor is coupled between a first reference voltage and a setting input terminal. The second resistor is coupled between a second reference voltage and the setting input terminal. The trigger circuit provides a switching signal in response to an operating signal. The switch circuit transmits a control signal to the setting input terminal in response to a first voltage level, and stops transmitting the control signal in response to a second voltage level. The power module executes one of a first power supply mode and a second power supply mode in response to a voltage value. When the control signal is not received, the power module executes a third power supply mode.

9 Claims, 2 Drawing Sheets

SELECTING EXTERNAL OR INTERNAL MODE SETTINGS FROM A SINGLE PIN

CROSS-REFERENCE TO RELATED APPLICATION

This application claims the priority benefit of Taiwan application serial no. 112107279, filed on Mar. 1, 2023. The entirety of the above-mentioned patent application is hereby incorporated by reference herein and made a part of this specification.

BACKGROUND

Technical Field

The disclosure relates to a control circuit for controlling a power module.

Description of Related Art

In the current electronic device, the power supply mode of the power module is determined by the processing circuit. The power supply mode determined by the processing circuit is not necessarily the power supply mode expected by the user. The power supply mode determined by the processing circuit may not conform to the best performance of the power module, thus reducing the power supply efficiency of the power module and increasing redundant energy waste.

SUMMARY

The disclosure provides a control circuit for controlling a power module, and the power module is configured to drive a processing circuit. The control circuit includes a first resistor, a second resistor, a trigger circuit, and a switch circuit. The first resistor is coupled between a first reference voltage and a setting input terminal of the power module. The second resistor is coupled between a second reference voltage and the setting input terminal. The trigger circuit provides a switching signal in response to an operating signal. The switch circuit is coupled to the trigger circuit, the processing circuit, and the setting input terminal. The switch circuit receives a control signal from the processing circuit. The switch circuit transmits the control signal to the setting input terminal in response to a first voltage level of the switching signal, and stops transmitting the control signal in response to a second voltage level of the switching signal. When the control signal is received, the power module executes one of a first power supply mode and a second power supply mode in response to a voltage value of the control signal. When the control signal is not received, the power module executes a third power supply mode.

In order for the features and advantages of the disclosure to be more comprehensible, the following specific embodiments are described in detail in conjunction with the drawings.

DETAILED DESCRIPTION OF DISCLOSED EMBODIMENTS

Figure 1:
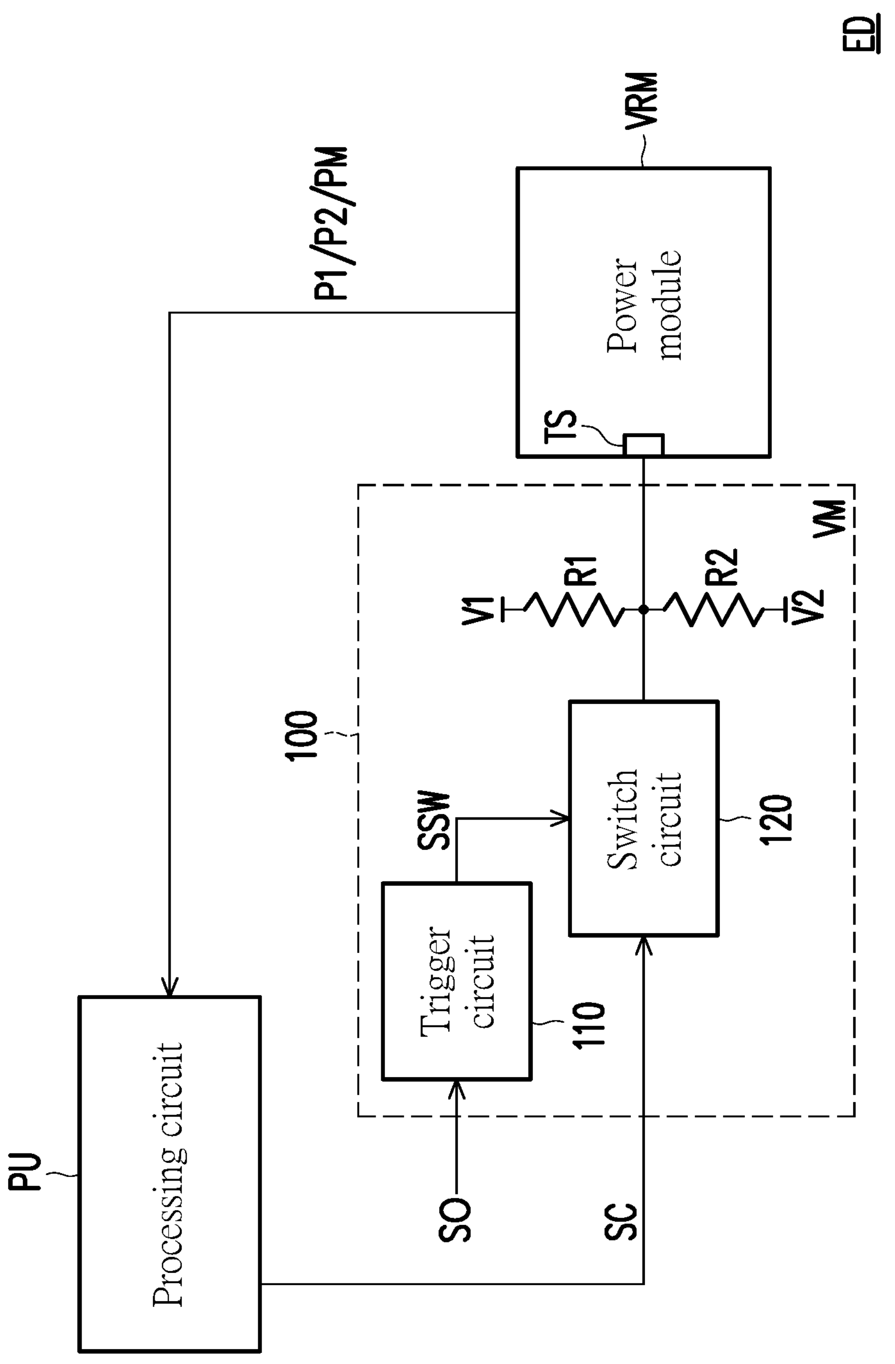
FIG. 1 is a schematic diagram of an electronic device according to an embodiment of the disclosure.

Some embodiments of the disclosure will be described in detail with reference to the drawings. For the stated reference numerals in the following description, the same reference numerals are regarded to be referring to the same or similar elements when appearing in different drawings. The embodiments are only a part of the disclosure and do not disclose all possible implementation manners of the disclosure. More specifically, the embodiments are only examples within the scope of the claims of the disclosure.

Please refer to FIG. 1. In the embodiment, an electronic device ED includes at least a processing circuit PU, a power module VRM, and a control circuit 100. The power module VRM is configured to drive the processing circuit PU. The processing circuit PU may be a computing core circuit such as a graphics processing unit or a central processing unit of the electronic device ED. The electronic device ED may be a notebook computer, a tablet computer, a smart phone, and other devices. The power module VRM may be a power circuit that provides different power supply modes.

In the embodiment, the control circuit 100 is configured to control the power module VRM. The control circuit 100 includes resistors R1 and R2, a trigger circuit 110, and a switch circuit 120. The resistor R1 is coupled between a first reference voltage V1 and a setting input terminal TS of the power module VRM. The resistor R2 is coupled between a second reference voltage V2 and the setting input terminal TS of the power module VRM. The trigger circuit 110 provides a switching signal SSW in response to an operating signal SO.

In the embodiment, the operating signal SO is provided through a user interface (UI) of the electronic device ED. The user may operate the user interface to generate the operating signal SO.

In the embodiment, the switch circuit 120 is coupled to the trigger circuit 110, the processing circuit PU, and the setting input terminal TS of the power module VRM. The switch circuit 120 receives a control signal SC from the processing circuit PU. The switch circuit 120 transmits the control signal SC to the setting input terminal TS in response to a first voltage level of the switching signal SSW. The switch circuit 120 stops transmitting the control signal SC in response to a second voltage level of the switching signal SSW. In other words, when the switch circuit 120 provides the switching signal SSW with the first voltage level, the setting input terminal TS of the power module VRM receives the control signal SC. On the other hand, when the switch circuit 120 provides the switching signal SSW with the second voltage level, the setting input terminal TS of the power module VRM does not receive the control signal SC.

In the embodiment, when the control signal SC is received, the power module VRM executes one of a first power supply mode and a second power supply mode in response to a voltage value of the control signal SC. When the control signal SC is not received, the power module VRM executes a third power supply mode. The first power supply mode, the second power supply mode, and the third power supply mode are different from each other.

It is worth mentioning here that the trigger circuit 110 provides the switching signal SSW in response to the operating signal SO. The switch circuit 120 transmits the control signal SC to the setting input terminal TS in response to the first voltage level of the switching signal SSW, and stops transmitting the control signal SC in response to the second voltage level of the switching signal SSW. When the control signal SC is not received, the power module VRM executes the third power supply mode to drive the processing circuit PU. In this way, the control circuit 100 can use the external operating signal SO to intervene and control the power module VRM to execute the third power supply mode.

In an embodiment, the power module VRM includes multiple power supply circuits (not shown). When the setting input terminal TS receives the control signal SC with a high voltage value, the power module VRM enters the first power supply mode. In the first power supply mode, the power module VRM uses all power supply circuits to provide a driving power P1 to the processing circuit PU.

When the voltage value of the control signal SC received by the setting input terminal TS is a low voltage value, the power module VRM executes the second power supply mode. In the second power supply mode, the power module VRM uses the minimum number of power supply circuits to provide a driving power P2 to the processing circuit PU.

When the setting input terminal TS does not receive the control signal SC, the control circuit 100 uses the resistors R1 and R2 to generate an intermediate voltage VM, and provides the intermediate voltage VM to the setting input terminal TS. The power module VRM executes the third power supply mode in response to the intermediate voltage VM. In the third power supply mode, the power module VRM determines the number of power supply circuits used according to an actual load state, and uses the number of power supply circuits to provide a driving power PM to the processing circuit PU. In other words, in the third power supply mode, the power module VRM adjusts the driving power PM for driving the processing circuit PU according to the actual load state. The third power supply mode may be referred to as an auto power saving (APS) mode.

In an embodiment, when the control signal received by the setting input terminal TS is a high impedance (Hi-Z) signal, the control circuit 100 also uses the resistors R1 and R2 to divide the first reference voltage V1 to generate the intermediate voltage VM, and provides the intermediate voltage VM to the setting input terminal TS. Therefore, the power module VRM executes the third power supply mode in response to the intermediate voltage VM.

In an embodiment, the intermediate voltage VM may be determined by the voltage value of the first reference voltage V1, the voltage value of the second reference voltage V2, and the resistance values of the resistors R1 and R2. For example, the resistance values of the resistors R1 and R2 are respectively 10 kΩ (the disclosure is not limited thereto). The voltage value of the first reference voltage V1 is 1.8 volts (the disclosure is not limited thereto). The voltage value of the second reference voltage V2 is 0 volts (the disclosure is not limited thereto). Therefore, the intermediate voltage VM is equal to 0.9 volts.

In addition, the control circuit 100 can use the external operating signal SO to intervene and control the power module VRM to execute the third power supply mode (for example, the APS mode). Therefore, the power module VRM may adjust the driving power PM for driving the processing circuit PU based on the actual load state. The power supply efficiency of the power module VRM can be maintained. In addition, compared with the first power supply mode, a battery of the electronic device ED has a longer service time in the third power supply mode.

Figure 2:
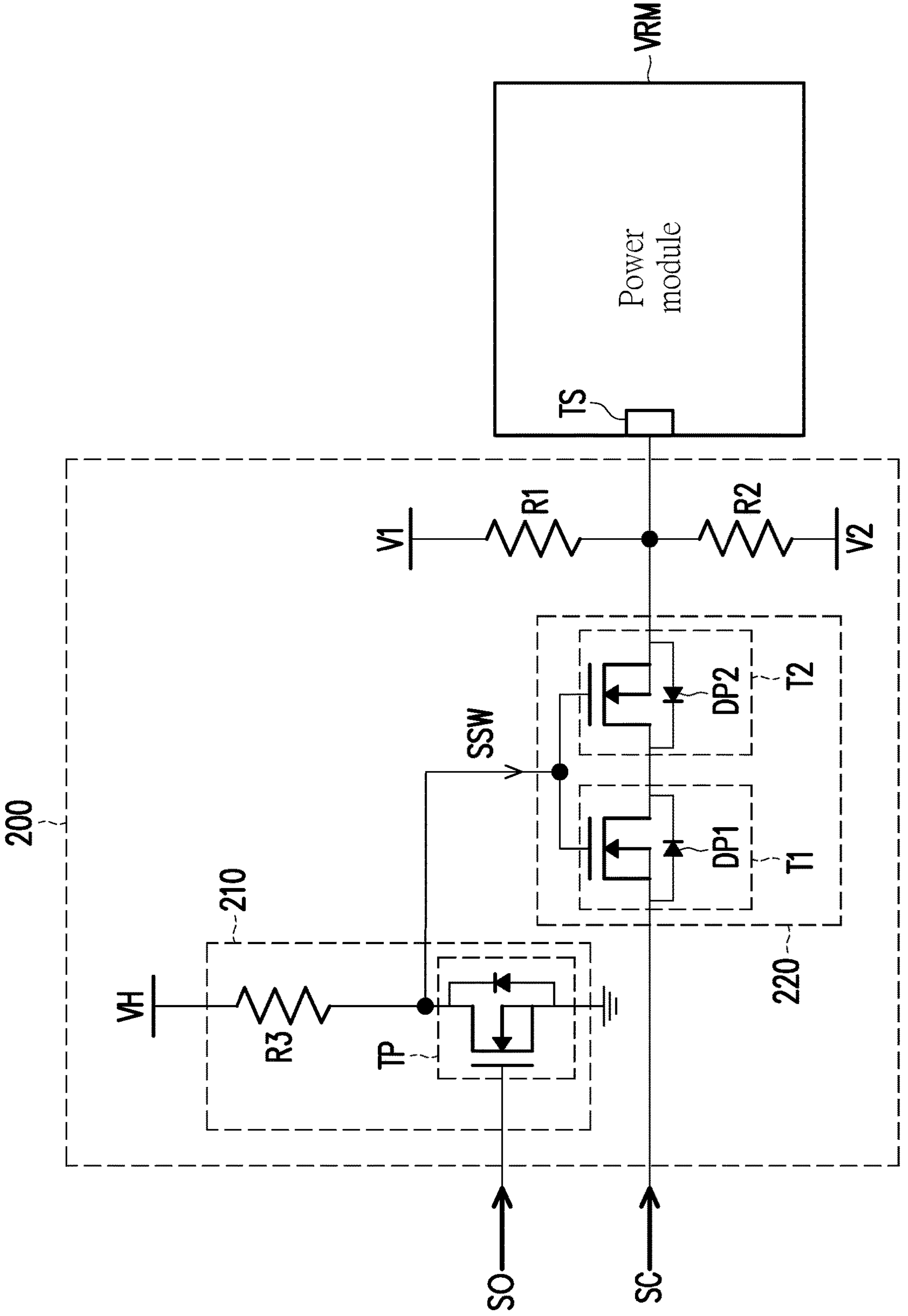
FIG. 2 is a schematic diagram of a control circuit and a power module according to an embodiment of the disclosure.

Please refer to FIG. 2. FIG. 2 shows the power module VRM and a control circuit 200. In the embodiment, the control circuit 200 includes the resistors R1 and R2, a trigger circuit 210, and a switch circuit 220. The switch circuit 220 includes transistors T1 and T2. A source of the transistor T1 receives the control signal SC. A gate of the transistor T1 receives the switching signal SSW. A source of the transistor T2 is coupled to the setting input terminal TS. A gate of the transistor T2 receives the switching signal SSW. A drain of the transistor T2 is coupled to a drain of the transistor T1.

In the embodiment, the trigger circuit 210 includes a resistor R3 and an operating transistor TP. A first terminal of the resistor R3 is coupled to a system high voltage VH. A second terminal of the resistor R3 is coupled to the gate of the transistor T1 and the gate of the transistor T2. A second terminal of the resistor R3 is an output terminal for outputting the switching signal SSW. A first terminal of the operating transistor TP is coupled to the second terminal of the resistor R3. A second terminal of the operating transistor TP is coupled to a reference low voltage (for example, ground). A control terminal of the operating transistor TP receives the operating signal SO.

When the switching signal SSW has the first voltage level, the transistors T1 and T2 are conducted. On the other hand, when the switching signal SSW has the second voltage level, the transistors T1 and T2 are disconnected.

It should be noted that the drain of the transistor T2 is coupled to the drain of the transistor T1. Therefore, a cathode of a parasitic diode DP1 in the transistor T1 is connected to a cathode of a parasitic diode DP2 in the transistor T2, which can ensure the signal isolation effect of the switch circuit 220 in the case where the transistors T1 and T2 are disconnected. Therefore, in the case where the transistors T1 and T2 are disconnected, the control signal SC is not leaked to the setting input terminal TS.

Please refer to FIG. 2 and Table 1 at the same time. Table 1 is a truth table of FIG. 2. In an embodiment, the transistors T1 and T2 and the operating transistor TP are respectively an N-type field effect transistor (the disclosure is not limited to the type of the transistor). The first voltage level is a high voltage level. The second voltage level is a low voltage level.

TABLE 1

| Operating signal SO | Control signal SC | Voltage value at setting input terminal TS | Power supply mode |
|---|---|---|---|
| L | H | H | First power supply mode |
| L | L | L | Second power supply mode |
| L | Hi-Z | VM | Third power supply mode |
| H | H | VM | Third power supply mode |
| H | L | VM | Third power supply mode |
| H | Hi-Z | VM | Third power supply mode |

When the operating signal SO with a low voltage level (marked as "L") is received, the operating transistor TP is disconnected. Therefore, the voltage value at the second terminal of the resistor R3 is roughly equal to the voltage value of the system high voltage VH, so that the switching signal SSW has the first voltage level. Therefore, the transistors T1 and T2 are conducted. The switch circuit 220 transmits the received control signal SC to the setting input terminal TS. In this way, the power module VRM executes one of the first power supply mode and the second power supply mode in response to the voltage value of the control signal SC. When the control signal SC has a high voltage level (marked as "H"), the voltage value received by the setting input terminal TS also has a high voltage level. Therefore, the power module VRM executes the first power supply mode. When the control signal SC has a low voltage level, the voltage value received by the setting input terminal TS also has a low voltage level. Therefore, the power module VRM executes the second power supply mode.

In addition, when the control signal SC is a high impedance signal, the control circuit 200 uses the resistors R1 and R2 to generate the intermediate voltage VM, and provides the intermediate voltage VM to the setting input terminal TS. Therefore, the power module VRM executes the third power supply mode in response to the intermediate voltage VM.

On the other hand, when the operating signal SO with a high voltage level is received, the operating transistor TP is conducted. Therefore, the voltage value at the second terminal of the resistor R3 is pulled down to the voltage value of a system low voltage, so that the switching signal SSW has the second voltage level. Therefore, the transistors T1 and T2 are disconnected. The switch circuit 220 cannot transmit the control signal SC. The control circuit 200 uses the resistors R1 and R2 to generate the intermediate voltage VM, and provides the intermediate voltage VM to the setting input terminal TS. Therefore, the power module VRM executes the third power supply mode in response to the intermediate voltage VM.

Therefore, once the user provides the operating signal SO with a high voltage level through the user interface, the power module VRM will ignore the control signal SC and execute the third power supply mode.

In summary, the trigger circuit provides the switching signal in response to the operating signal. The switch circuit transmits the control signal to the setting input terminal in response to the first voltage level of the switching signal, and stops transmitting the control signal in response to the second voltage level of the switching signal. When the control signal is not received, the power module executes the third power supply mode to drive the processing circuit. In this way, the control circuit can use the external operating signal to control the power supply mode of the power module. In addition, in the third power supply mode, the power module adjusts the driving power for driving the processing circuit according to the actual load state. Therefore, the power supply efficiency of the power module can be maintained. The battery of the electronic device has a longer service time in the third power supply mode.

Although the disclosure has been disclosed in the above embodiments, the embodiments are not intended to limit the disclosure. Persons skilled in the art may make some changes and modifications without departing from the spirit and scope of the disclosure. Therefore, the protection scope of the disclosure shall be defined by the appended claims.

What is claimed is:

1. A control circuit for controlling a power module, wherein the power module is configured to drive a processing circuit, the control circuit comprising:

- a first resistor, coupled between a first reference voltage and a setting input terminal of the power module;
- a second resistor, coupled between a second reference voltage and the setting input terminal;
- a trigger circuit, configured to provide a switching signal in response to an operating signal; and
- a switch circuit, coupled to the trigger circuit, the processing circuit, and the setting input terminal, and configured to receive a control signal from the processing circuit, transmit the control signal to the setting input terminal in response to a first voltage level of the switching signal, and stop transmitting the control signal in response to a second voltage level of the switching signal,
- wherein when the control signal is received, the power module executes one of a first power supply mode and a second power supply mode in response to a voltage value of the control signal, and
- wherein when the control signal is not received, the power module executes a third power supply mode,
- wherein the switch circuit comprises a first transistor and a second transistor,
- wherein a source of the first transistor receives the control signal, and a gate of the first transistor receives the switching signal, and
- wherein a source of the second transistor is coupled to the setting input terminal, a gate of the second transistor receives the switching signal, and a drain of the second transistor is coupled to a drain of the first transistor,
- wherein:
- when the switching signal has the first voltage level, the first transistor and the second transistor are conducted, and
- when the switching signal has the second voltage level, the first transistor and the second transistor are disconnected.

2. The control circuit according to claim 1, wherein the operating signal is provided through a user interface.

3. The control circuit according to claim 1, wherein when a voltage value of the control signal received by the setting input terminal is a high voltage value, the power module executes the first power supply mode.

4. The control circuit according to claim 1, wherein when a voltage value of the control signal received by the setting input terminal is a low voltage value, the power module executes the second power supply mode.

5. The control circuit according to claim 1, wherein:

- when the control signal received by the setting input terminal is a high impedance signal, the control circuit uses the first resistor and the second resistor to generate an intermediate voltage, and provides the intermediate voltage to the setting input terminal,
- the power module executes the third power supply mode in response to the intermediate voltage, and
- a voltage value of the intermediate voltage is between a voltage value of the first reference voltage and a voltage value of the second reference voltage.

6. The control circuit according to claim 1, wherein:

- when the control signal is not received, the control circuit uses the first resistor and the second resistor to generate an intermediate voltage, and provides the intermediate voltage to the setting input terminal,
- the power module executes the third power supply mode in response to the intermediate voltage, and
- a voltage value of the intermediate voltage is between a voltage value of the first reference voltage and a voltage value of the second reference voltage.

7. The control circuit according to claim 6, wherein the voltage value of the intermediate voltage is determined by the voltage value of the first reference voltage, the voltage value of the second reference voltage, a resistance value of the first resistor, and a resistance value of the second resistor.

8. The control circuit according to claim 1, wherein the trigger circuit comprises:

- a third resistor, wherein a first terminal of the third resistor is coupled to a system high voltage, and a second terminal of the third resistor is coupled to the gate of the first transistor and the gate of the second transistor; and
- an operating transistor, wherein a first terminal of the operating transistor is coupled to the second terminal of the third resistor, a second terminal of the operating transistor is coupled to a reference low voltage, and a control terminal of the operating transistor receives the operating signal.

9. A control circuit for controlling a power module, wherein the power module is configured to drive a processing circuit, the control circuit comprising:

a first resistor, coupled between a first reference voltage and a setting input terminal of the power module;

a second resistor, coupled between a second reference voltage and the setting input terminal;

a trigger circuit, configured to provide a switching signal in response to an operating signal; and a switch circuit, coupled to the trigger circuit, the processing circuit, and the setting input terminal, and configured to receive a control signal from the processing circuit, transmit the control signal to the setting input terminal in response to a first voltage level of the switching signal, and stop transmitting the control signal in response to a second voltage level of the switching signal, wherein when the control signal is received, the power module executes one of a first power supply mode and a second power supply mode in response to a voltage value of the control signal, and wherein when the control signal is not received, the power module executes a third power supply mode, wherein the switch circuit comprises:

a first transistor, wherein a source of the first transistor receives the control signal, and a gate of the first transistor receives the switching signal; and a second transistor, wherein a source of the second transistor is coupled to the setting input terminal, a gate of the second transistor receives the switching signal, and a drain of the second transistor is coupled to a drain of the first transistor, wherein the trigger circuit comprises:

a third resistor, wherein a first terminal of the third resistor is coupled to a system high voltage, and a second terminal of the third resistor is coupled to the gate of the first transistor and the gate of the second transistor; and an operating transistor, wherein a first terminal of the operating transistor is coupled to the second terminal of the third resistor, a second terminal of the operating transistor is coupled to a reference low voltage, and a control terminal of the operating transistor receives the operating signal.

* * * * *